United States Patent
Barry

(10) Patent No.: US 9,183,887 B2
(45) Date of Patent: Nov. 10, 2015

(54) INTERACTIVE MULTIMEDIA APPARATUS

(75) Inventor: James Anthony Barry, Rathmines (IE)

(73) Assignee: THURDIS DEVELOPMENTS LIMITED, Dublin (IE)

( * ) Notice: Subject to any disclaimer, the term of this patent is extended or adjusted under 35 U.S.C. 154(b) by 1557 days.

(21) Appl. No.: 12/096,878

(22) PCT Filed: Dec. 19, 2006

(86) PCT No.: PCT/IE2006/000143
§ 371 (c)(1),
(2), (4) Date: Oct. 31, 2008

(87) PCT Pub. No.: WO2007/072467
PCT Pub. Date: Jun. 28, 2007

(65) Prior Publication Data
US 2009/0132075 A1    May 21, 2009

Related U.S. Application Data

(63) Continuation-in-part of application No. 10/490,195, filed as application No. PCT/IE02/00142 on Oct. 9, 2002, now abandoned.

(30) Foreign Application Priority Data

Dec. 19, 2005   (IE) .................................. S2005/0846
Jun. 30, 2006   (IE) .................................. S2006/0492

(51) Int. Cl.
*G06F 17/00*    (2006.01)
*G11B 27/34*    (2006.01)
*G11B 27/031*   (2006.01)
*G10H 1/00*     (2006.01)

(52) U.S. Cl.
CPC .............. *G11B 27/34* (2013.01); *G11B 27/031* (2013.01); *G10H 1/0025* (2013.01); *G10H 2210/125* (2013.01)

(58) Field of Classification Search
CPC ............... G11B 27/031; G10H 1/0025; G10H 2210/125
USPC ......................................................... 700/94
See application file for complete search history.

(56) References Cited

U.S. PATENT DOCUMENTS

| | | | |
|---|---|---|---|
| 6,204,840 B1 * | 3/2001 | Petelycky et al. ............. | 715/202 |
| 2003/0146915 A1 * | 8/2003 | Brook et al. ................... | 345/473 |
| 2004/0027369 A1 * | 2/2004 | Kellock et al. ................ | 345/716 |
| 2005/0203917 A1 * | 9/2005 | Freeberg et al. ............... | 707/10 |
| 2006/0028951 A1 * | 2/2006 | Tozun et al. ................... | 369/84 |

FOREIGN PATENT DOCUMENTS

WO     WO 03046913 A1 *   6/2003

* cited by examiner

*Primary Examiner* — Joseph Saunders, Jr.
(74) *Attorney, Agent, or Firm* — Hoffmann & Baron, LLP

(57) ABSTRACT

An interactive multimedia apparatus (1) usable in combination with a software suite of authoring programs (2) installed in a computing means of a mobile data processing apparatus (3) of the type having a display means (4) and one or more input means (4) is disclosed. The interactive multimedia apparatus (1) provides a bundle of tools which together enable a multimedia composition to be generated in real time on the mobile data processing apparatus (3). The present invention utilizes individual channels (11, 40) to ensure users can interact directly with individual files (10) and set various composition authoring parameters (14) both before and during a mixing cycle to dynamically create a multimedia composition.

51 Claims, 16 Drawing Sheets

| Registry entry | Description |
|---|---|
| Chanel1 – Channel 4 | The track name for each channel. |
| Channel1Dir – Channel4 Dir | The track directories on the device. |
| Master volume | The volume level used during playback of the mix. This volume level is controlled by the Master Volume slider found on the equalizer screen. |
| Channel 1 Volume – Channel 4 volume. | The volume level for each track. This volume level is controlled via the channel volume sliders found on the equalizer screen. |
| Channel 1 Enable – Channel 4 Enable | Holds the state of the track enable buttons found on the equalizer screen. |
| VersionId | The application version shown on the Home screen. |

Figure 13

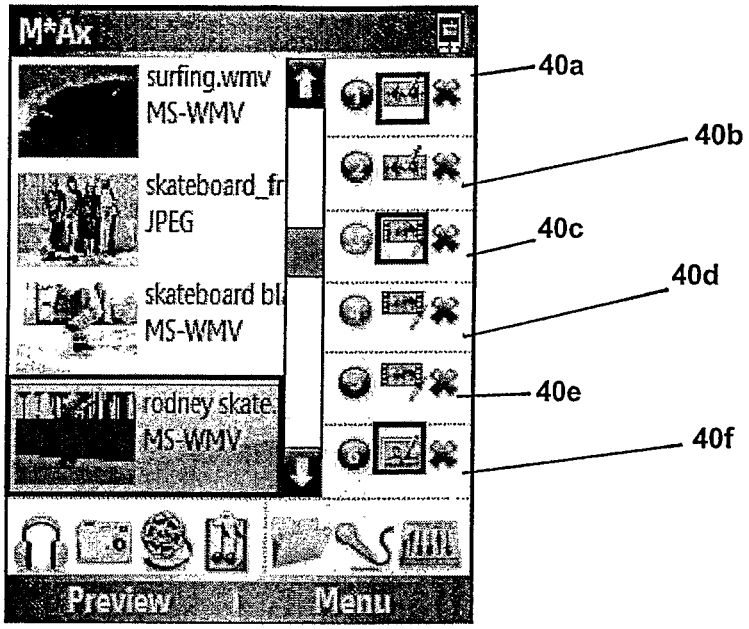
Figure 14
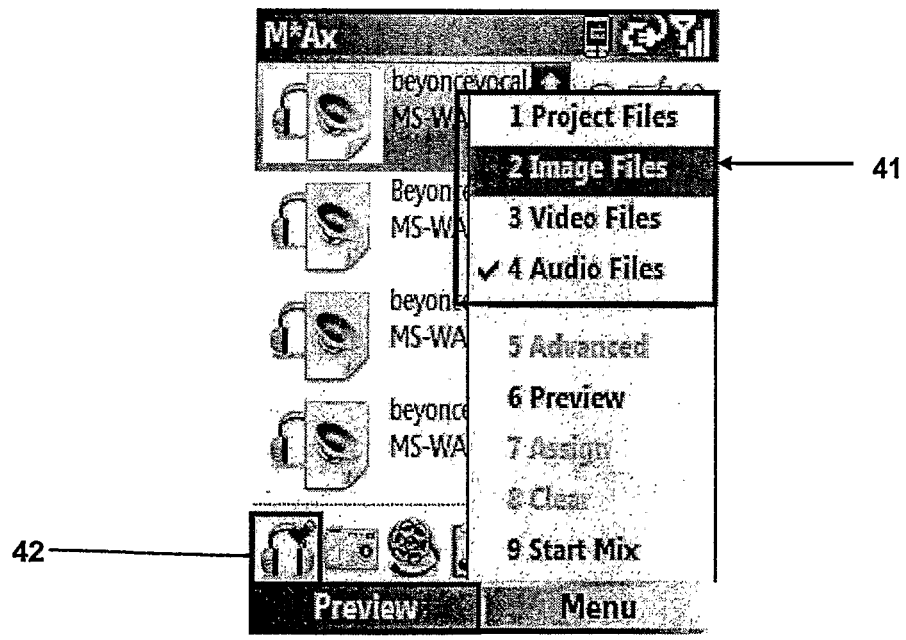
Figure 14.1

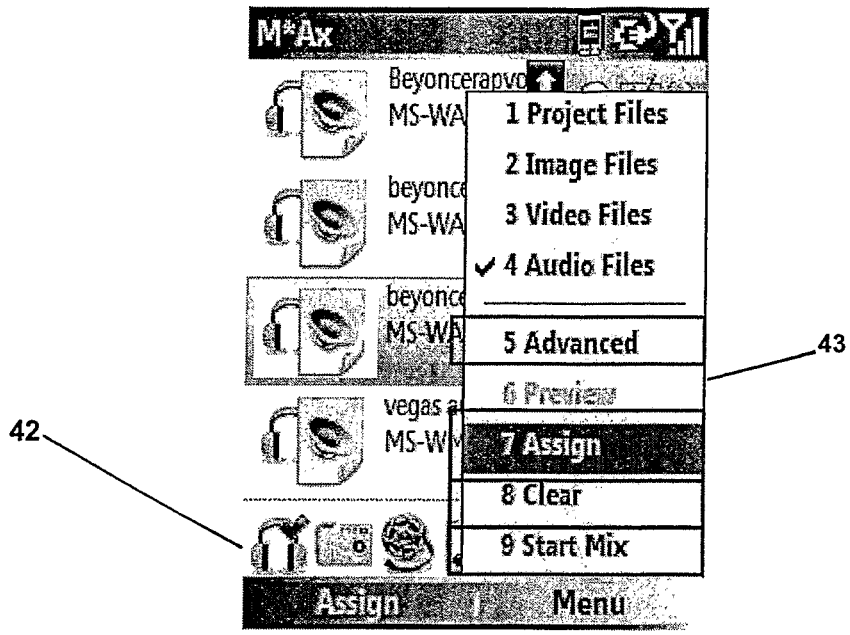
Figure 14.2
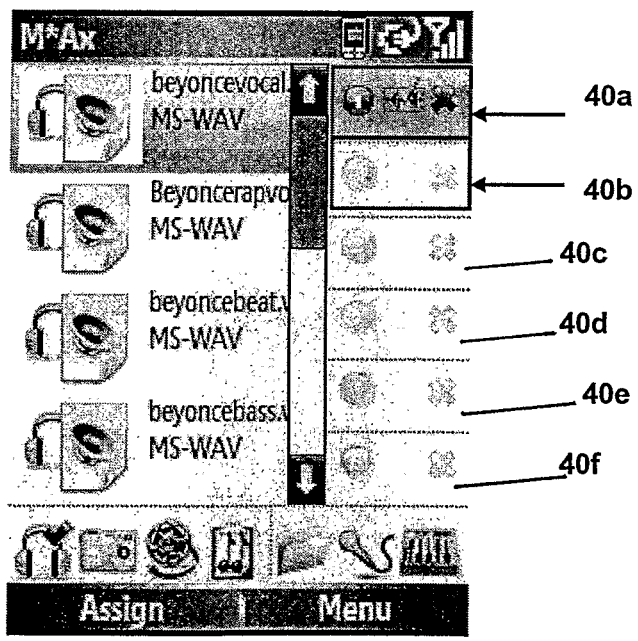
Figure 14.3

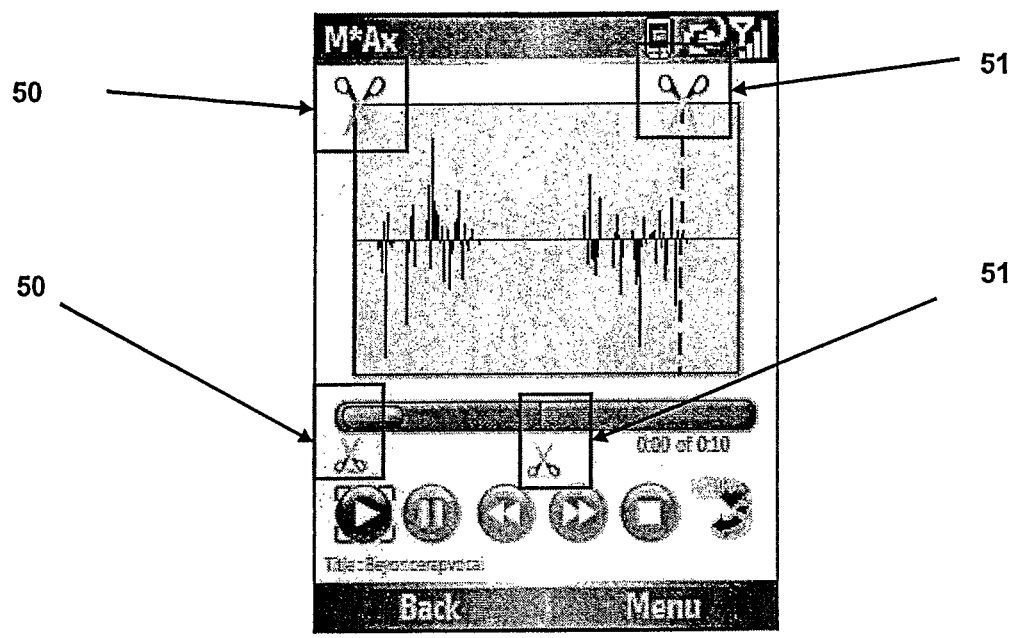
Figure 15
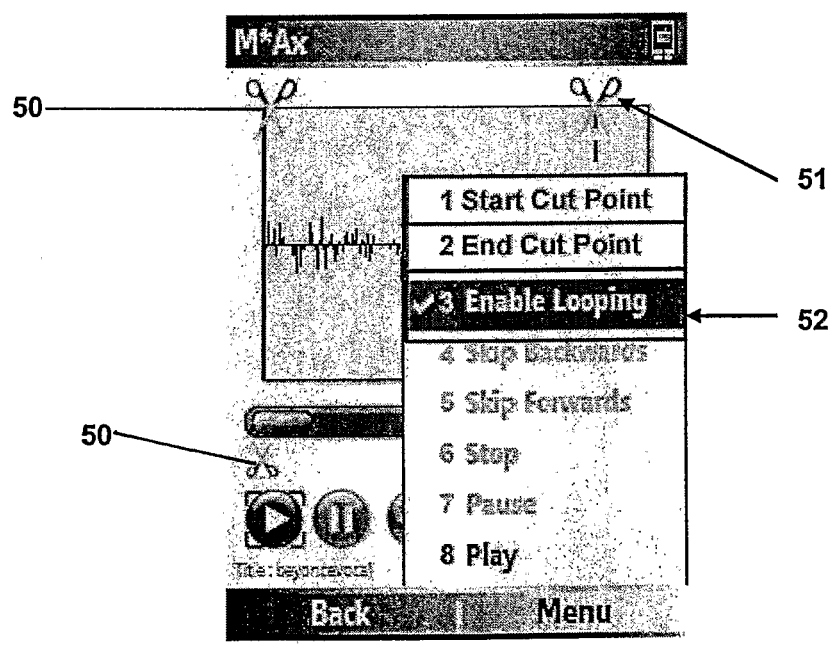
Figure 15.1

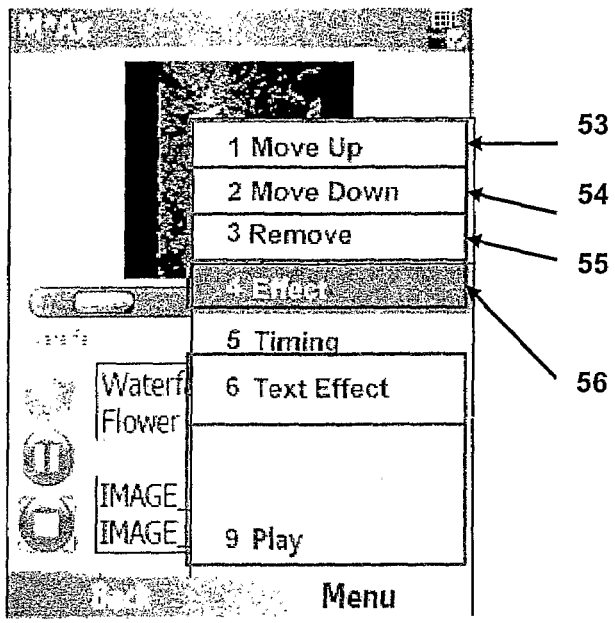
Figure 17.1
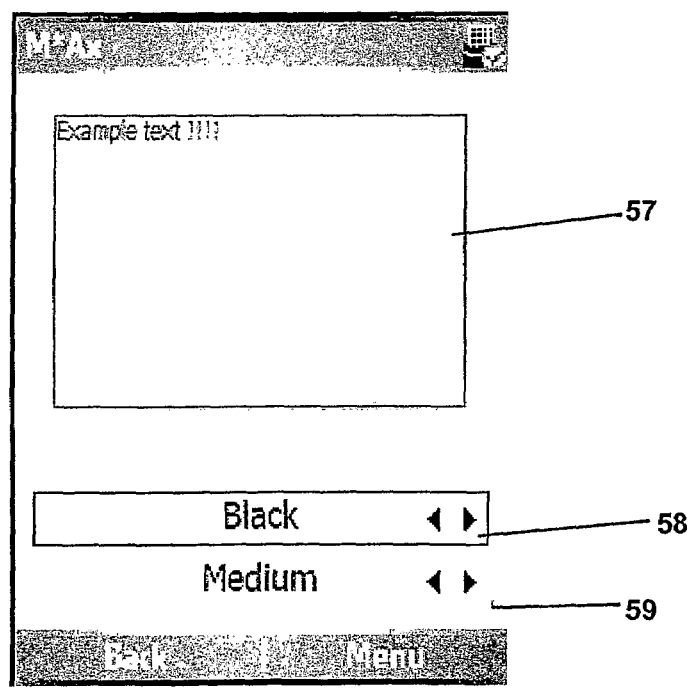
Figure 18

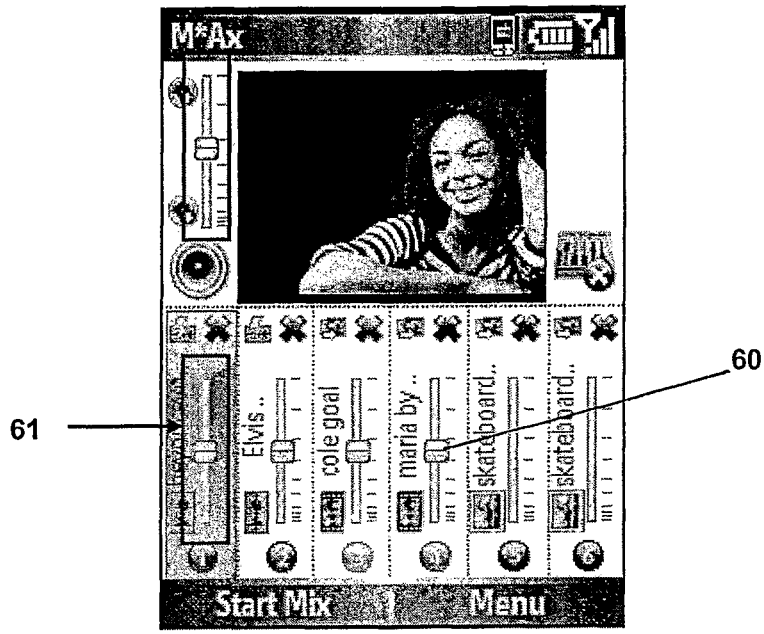
Figure 19
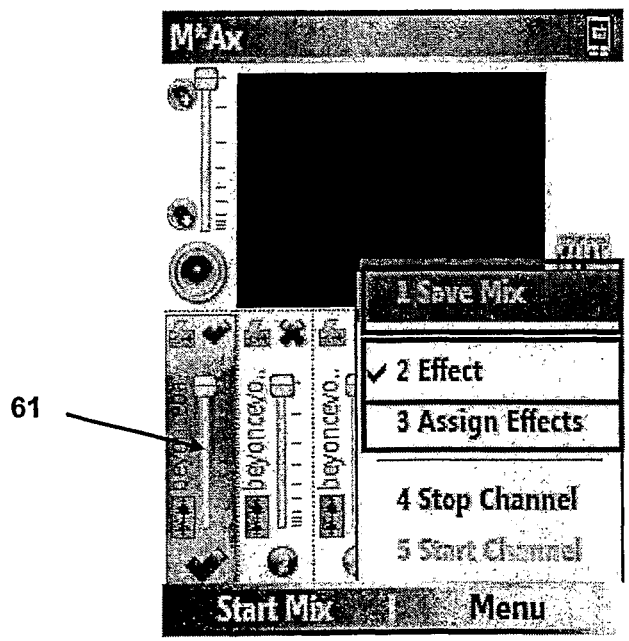
Figure 19.1

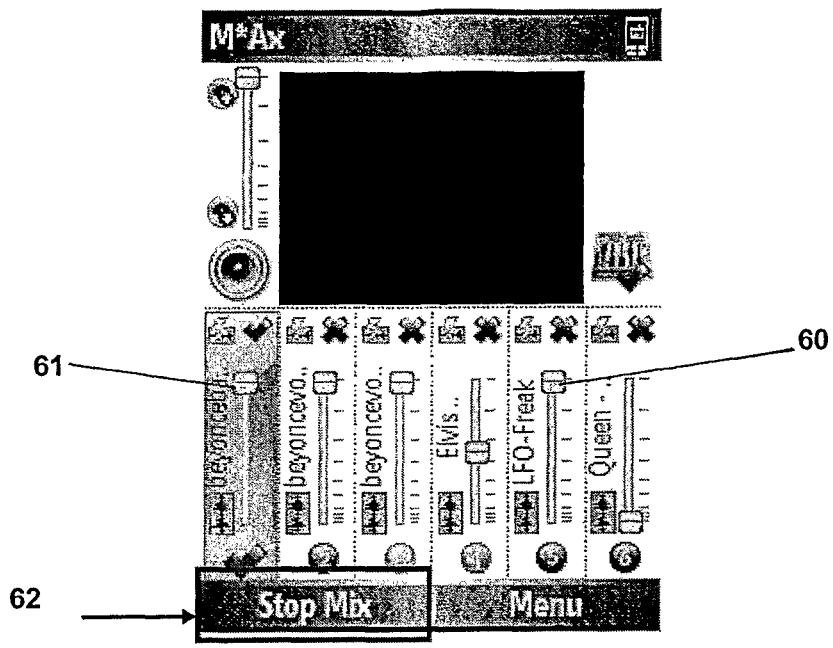
Figure 19.2
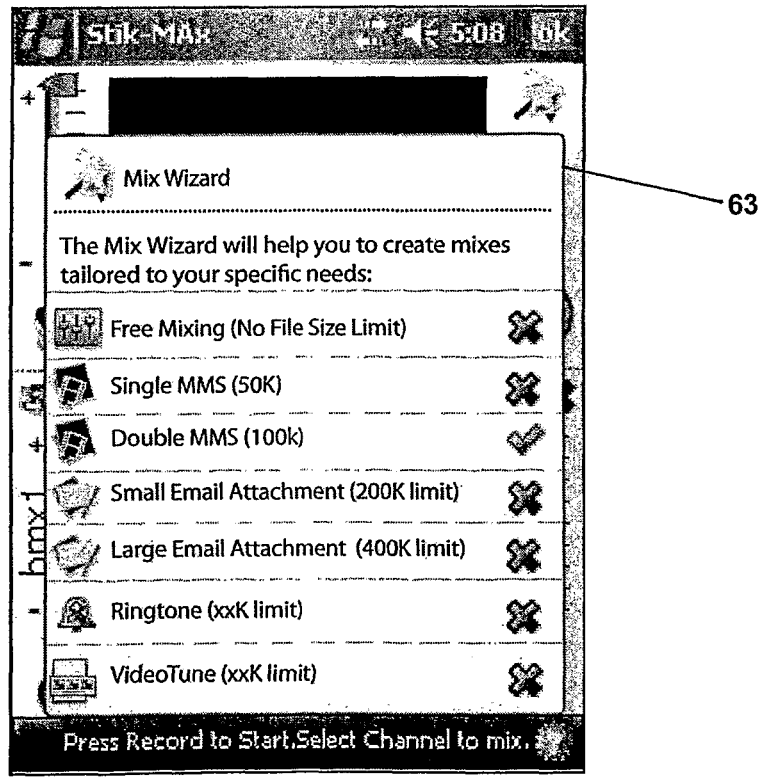
Figure 19.3

INTERACTIVE MULTIMEDIA APPARATUS

CROSS-REFERENCE TO RELATED APPLICATIONS

The subject application is a continuation-in-part of U.S. application Ser. No. 10/490,195, filed on Mar. 9, 2004, now abandoned, which is a U.S. National Phase of International Application No. PCT/IE02/00142, filed Oct. 9, 2002, which corresponds to WIPO Publication No. WO 03/046913, published on Jun. 5, 2003, and the subject application is the U.S. National Phase of, and Applicant claims priority from, International Application Number PCT/IE2006/000143 filed 19 Dec. 2006, Irish Application bearing Serial No. S2005/0846 filed 19 Dec. 2005, and Irish Application bearing Serial No. S2006/0492 filed 30 Jun. 2006, which are incorporated by reference herein in their entireties.

BACKGROUND OF THE INVENTION

The present invention relates to an interactive multimedia apparatus usable in combination with a software suite of authoring programs installed in a computing means of a mobile data processing apparatus of the type having a display means and one or more input means.

The present invention is an improvement to the apparatus disclosed by the applicants in International Patent Publication No. WO2003/046913, the contents of which specification are incorporated herein by direct reference.

Electronic mixing software for PC and computer based products is known and there are packages available both commercially and as freeware over the internet. These packages allow users create tracks which contain loops, riffs, beats, one shots or the contents of a CD, track, microphone inputs, video files etc and to mix them together to produce their desired sound output compilation. The user places each selected loop, riff, one shot, video clip, CD output, microphone input etc. in a selected track position along the time axis ruler bar so that they are mixed at that time in the play cycle. The content, which can be WAV, MP3, WMA or any other digital media format being mixed, has been prepared at a recorded tempo and is of a fixed length of time. The desired mix will usually contain multiple tracks of differing beats, loops, riffs, one shots, voices, video etc.

Most digital mixing software packages allow the user to set up a series of controls and effects for each channel in advance of the mixing process occurring and will also allow some limited global control of the composite mix output. The control and effects are usually applied in advance of the mixing process occurring, but some limited control is allowed during the mixing cycle. Some of the individual track parameters, which are allowed to be altered during the mixing process, would include volume, mute, tempo and tone. Special effects are not normally allowed during the mixing process.

There are many digital software music-editing packages available on the market both commercially and as freeware over the internet. These packages allow the user to edit riffs, loops, beats, one shots, CD outputs and other media context by cut, paste, copy and other known techniques for editing digital content. The editing process requires the user to select a portion of the waveform and reposition or alter the characteristics and parameters of the waveform. The user can change the characteristics of the waveform, add effects, move it or reposition it with the same track, cut and paste it or copy it to a newly created track. The editing process is accomplished by using either a mouse or a keyboard or a combination of both. If the user wishes to use only a segment of a loop, beat, riff, one shot, video clip, microphone input etc they must first pre-edit it and then insert it in a track in its play position along the time axis ruler to be mixed at that predefined time in the mix cycle.

A problem with these known applications is that they are not able to be deployed to devices with limited processing power, and in particular, mobile data processing apparatuses, such as mobile telephones. Further problems arise in the use of mobile phones for such applications due to size restrictions on telephone displays and difficulties in presenting and navigating display information.

It is therefore an object of the present invention to provide an interactive multimedia apparatus for use in a mobile data processing environment which goes some way toward overcoming the above problems, and/or which may provide the public or industry with a useful alternative.

STATEMENTS OF INVENTION

According to the invention, there is provided an interactive multimedia apparatus usable in combination with a software suite of authoring programs installed in a computing means of a mobile data processing apparatus of the type having a display means and one or more input means characterised in that the apparatus comprises user control means operable to allow a user to transmit one or more of an audio file and a video file and a still image file and a text file, including a combination thereof, to a plurality of channels on the mobile data processing apparatus, and then to activate a selection of the channels to enable the files in the selected channels to be combined in a mixing cycle to generate a multimedia composition having one or more of audio content and video content and still image content and text content, and whereby the user control means is further operable to enable the user to set composition authoring parameters assigned to each channel, the parameters then being applied to the files in the channels by the authoring programs to generate the multimedia composition.

The present invention provides users with a collection of functions for processing multimedia files which together provide users with efficient tool for manipulating multimedia content into composition using a mobile device. The provision of the control means and channels for receiving media files provides users with a technical tool for the retrieval, selection and modification of the stored media files on the device. The arrangement of the channels and authoring tools in such a way as to be manipulated via the mobile device provides an arrangement enabling users to manage the technical tasks involved in composing a multimedia composition.

In another embodiment of the invention, the composition authoring parameters will modify, refine, adjust, vary and/or change performance characteristics of the files transmitted to the channels.

The ability for users to set composition authoring parameters will enable those users to be able to efficiently and directly manipulate characteristics of the input multimedia files to, for example, apply special effects, to the file content.

In a further embodiment of the invention, further comprising means for enabling the composition authoring parameters to be settable and adjustable during combining of the channels during the mixing cycle to form the multimedia composition.

This provides users with full control over the composition process by enabling users to be able specify, and where necessary, re-specify performance characteristics during the entire composition generation process.

In another embodiment of the invention, the mobile communications apparatus further comprises an accessible data store having one or more audio files, video files, still image files and/or text files stored thereon.

In a further embodiment of the invention, the multimedia composition is generated in real time.

The ability of the present invention to combine all the channels of media content to generate a composition in real time is particularly advantageous as it enables users to produce the multimedia compositions quickly and without any delay. With the limited processing capacity available to such devices this is a significant advance in the area of multimedia data processing.

In another embodiment of the invention, the user control means is further operable to enable users to specify the sequence of individual frames in a multimedia composition having video content.

This feature provides users with tool to efficiently specify changes to a composition having video content.

In a further embodiment of the invention, the interactive multimedia apparatus further comprises scanning means for searching the data store, and files stored on the mobile communications apparatus, for all files having predefined file formats.

In another embodiment of the invention, the files having different file formats are able to be combined into a single or multiple multimedia compositions.

In a further embodiment of the invention, the apparatus further comprises means for storing a record of the composition authoring parameters set for each composition.

In another embodiment of the invention, the apparatus further comprises means for presenting an indicator of each file which is suitable for use in a composition is presented for selection to the user on the display means of the mobile communications apparatus.

In another embodiment of the invention, the apparatus further comprises means for presenting an indicator of each channel is shown on the display means of the mobile communications apparatus.

In another embodiment of the invention, the file indicators are shown adjacent the channel indicators on the display means of the mobile communications apparatus.

In a further embodiment of the invention, an indicator of each composition authoring parameter is shown adjacent to the indicator of the channel to which it is assigned.

In another embodiment of the invention, means are provided for presenting an indicator of a file transmitted to a channel at a specific time is shown on the display means of the mobile communications apparatus In a further embodiment of the invention, means are provided for presenting an indicator of the file format of a file transmitted to a channel at a specific time is shown on the display means of the mobile communications apparatus In another embodiment of the invention, it is ascertainable from the indictors whether or not a composition authoring parameter has been set by a user and/or a file has been transmitted to a channel.

The indicators are arranged relative to one another in order to convey information to users concerning files and the progress of a composition. The ability for each file and the file format of a file to be represented visually on the mobile device enables a fast and efficient means for presenting files for selection by the user on the display means of the mobile device, which it will be appreciated, is of limited size.

In another embodiment of the invention, when a further file is transmitted to a channel already having a file transmitted thereto the further file replaces the file presently in the channel.

In a further embodiment of the invention, when a further file is transmitted to a channel already having a file transmitted thereto the further file is incorporated into the channel with the previously transmitted file.

In another embodiment of the invention, the apparatus further comprises means for enabling each composition generated to be transmitted as a multimedia message or e-mail, posted to a web-site, saved as a ring-tone, video-tune, caller identification and/or wallpaper and is also able to be saved for transmission to a further device.

Preferably, the mobile data processing apparatus is a mobile telephone.

It will be appreciated that the mobile data processing apparatus can alternatively be a portable digital assistant (PDA), MP3 player, gaming device or other portable device.

Preferably, means are provided for enabling a multimedia composition generated to uniquely identify a telecommunications device which is calling the mobile data processing apparatus.

In another embodiment of the invention, the input means comprises one or more of a video camera and a video recorder and an audio microphone and a keyboard and a mouse and a touch screen and a 3D input device and a tactile sensor and a voice recognition device and digitising hardware.

In another embodiment of the invention, means are provided for a user to record their own voice and/or other sounds originating outside the mobile communications device and use those recordings to form part of a composition by transmitting to a channel.

In another embodiment of the invention, each composition has a start and a finish point which are shown on the display as spaced apart indicators, and means are provided for a user to edit sections of the composition with reference to the start and finish indicators.

In another embodiment of the invention, means are provided for users to create slideshows using multiple compositions and to assign text to be displayed on the display means to each slide in the slide show.

In another embodiment of the invention, the user control means is further operable to enable users to specify the sequence of slides in a slide show.

In another embodiment of the invention, means are provided for users to assign specific text and text effects to each channel for application to a composition.

In another embodiment of the invention, means are provided for a user to access further composition authoring parameters, including advanced editing features, for each channel once a file has been transmitted to a channel.

In another embodiment of the invention, the control means is further operable to enable users or mobile phone operators to set upper threshold size limits for compositions and/or individual files in a composition.

Preferably, means are provided for transmitting an alert is notified to a user via the mobile device when the upper threshold size limit is about to be reached or when it has been reached.

In another embodiment of the invention, means are provided for displaying the indicators for each file in a channel to users at a first resolution during the mixing cycle, and then on generation of the composition displaying the indicators for each file at a second resolution which differs from the first resolution.

In another embodiment of the invention, the first resolution is lower or higher than the second resolution.

In another embodiment of the invention, the apparatus further comprises means for enabling users to set the first and/or second resolutions.

In another embodiment of the invention, each file has a file extension which comprises tempo and beat map information for the file.

In another embodiment of the invention, the apparatus further comprises means for ensuring that the use of the present invention does not interfere with the normal operation of the mobile communications apparatus or prevent the execution of other applications on the mobile communications apparatus.

For the purposes of the following specification the term 'authoring programs' will be understood to include software programs being used for designing, creating, collecting, formatting, and/or encoding data for use in a multimedia composition.

For the purposes of the following specification the term 'control means' will be understood to include features of the mobile communications device enabling user interaction or input to initiate an action, display information, or set values and transfer data from or within the mobile communications device.

For the purposes of the following specification the term 'performance characteristics' will be understood to mean features affecting the way in which a file will be rendered, such as resolution, tempo or beat map.

For the purposes of the following specification the term 'composition' will be understood to include a multimedia mix of at least one file.

The present invention thus provides an interactive multimedia apparatus, usable in combination with a software suite of programs suitable for mobile communications apparatus installed in a computing means of a mobile communications apparatus with a display component and one or more input components. The apparatus includes control means which may be operated by users to effectively modify, refine, adjust, vary and/or change characteristics, parameters and special effects of individual audio or video tracks and/or characteristics and parameters and special effects of a composite audio mix during the mixing cycle in real time.

The mobile communications apparatus is a mobile telephone. Ideally the mobile telephone is a 2.5 G, 3 G or of higher specification and supports an operating system such as Windows Mobile 2003SE, however any suitable operating system known to a person skilled in the art can be used. Typically the application is implemented using C++ and Embedded Visual Tools 4, again any suitable implementing system known to a person skilled in the art can be used. Conveniently the mobile telephone of the invention has a input means forming a user interface driven by a touch screen and/or front panel keys on the phone. In such an embodiment, the left, right, up down, enter which may correspond to numerical keys 4\6\2\8\ enter respectively).

The authoring programs and other executable files associated with the present invention are provided by a series of dynamic link libraries. Conveniently the files are packaged up into a cabinet file (.cab file) which may be executed on a mobile telephone to thereby install the mobile telephone. Methods such ActiveSync would be suitable to achieve this.

The present invention also allows users to record any dynamically applied parameters, such as any special effects initiated by the user control means, which have been applied during the mixing cycle and/or generation of the multimedia composition. The user is also provided with a visual representation in the form of a pictograms, icons or other representation or indicator of each track or file in the mix.

The position in time that the user initiated or set various composition authoring parameters during in the mix cycle is also shown, with highlighted blocks or indicators showing which of the various performance characteristics of the files which have been changed, as well as where additions, deletions or modifications, control changes, parameter changes and/or special effects have been applied.

User can record their own voice and/or other external sounds and use those recordings to form part of a composition.

DETAILED DESCRIPTION OF THE INVENTION

The invention will hereinafter be more particularly described with reference to the accompanying drawings which show, by way of example only, one embodiment of the system of the invention. In the drawings:

FIG. 13 is a table showing the registry entries for the user interface layer;

FIG. 14 shows a channel assignment screen where the user will be able to find all supported media files on the device and assign media to each of the channels;

FIG. 15 shows an Advanced Audio screen where the user can edit sections of the audio;

FIG. 18 shows an Text Effects Screen where the user can assign start and end credits to their mix as well as assigning text and text effects to individual channels;

FIG. 19 shows an Mixer Screen where the user can create live mixes using any combination of audio, video or images;

Figure 21:
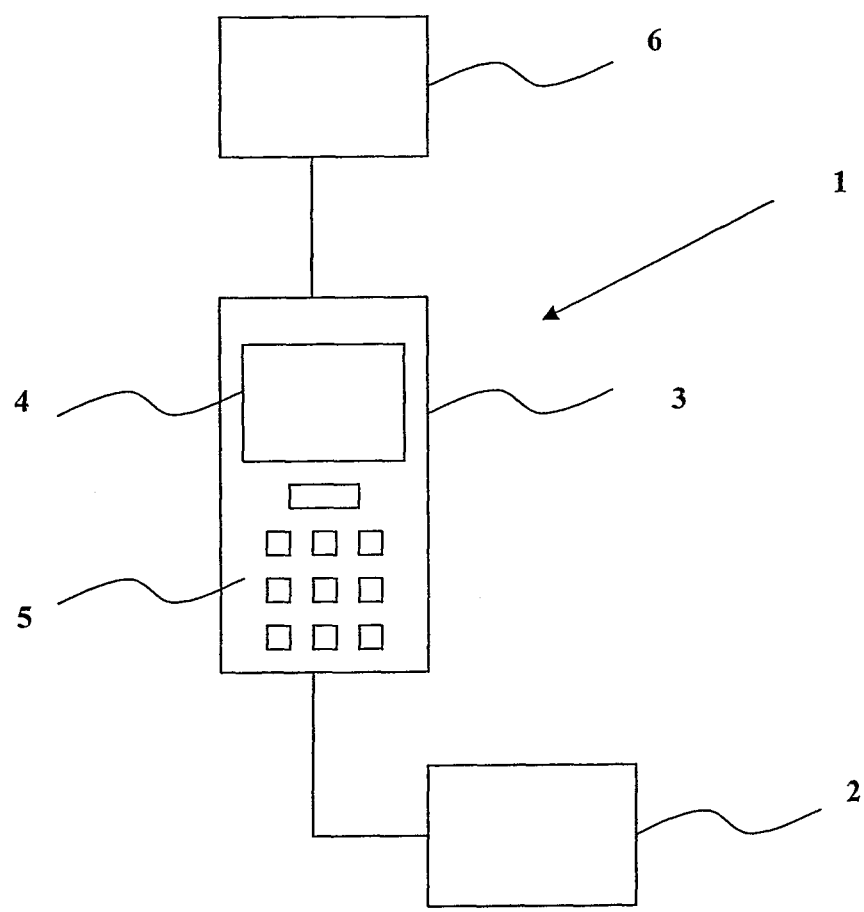
FIG. 21 is a block diagram of a system incorporating the interactive multimedia apparatus according to the present invention.

Referring to the drawings, and initially to FIG. 21 thereof, there is shown an interactive multimedia apparatus, indicated generally by the reference numeral 1 usable in combination with a software suite of authoring programs 2 installed in a computing means of a mobile communications apparatus, which in the instance shown is a mobile telephone 3 having a display means 4 and one or more input means formed as an alphanumeric keypad 5. It will be appreciated however that, depending on the specific mobile communications device being used the input means may also comprise one or more of a video camera and a video recorder and an audio microphone and a keyboard and a mouse and a touch screen and a 3D input device and a tactile sensor and a voice recognition device and digitising hardware.

With reference now to FIGS. 1 to 6, the apparatus 1 comprises user control means operable to allow a user to transmit files, indicated generally by the reference numeral 10, which files may be an audio file, a video file, a still image file and a text file, including a combination thereof, to a plurality of channels, indicated generally by the reference numeral 11 on the mobile telephone 1. In the instance shown, four channels 11a-11d are provided although it will be appreciated that any number of channels can be provided.

It will be appreciated that the mobile telephone 3 further comprises an accessible data store 6 (see FIG. 21) having one or more of the files 10, namely audio files, video files, still image files and/or text files stored thereon. The mobile telephone 3 also comprises scanning means for searching the data store 6, and files 10 stored on the mobile telephone, for all files having predefined file formats. Such predetermined formats will generally include all of those file formats which are able to be supported and included into a multimedia composition as it will be understood that files 10 having different file formats are able to be combined into a single or multiple multimedia compositions. An indicator 12 for each file 10 which is suitable for use in a composition is presented for selection to the user on the display means 4 of the mobile telephone 3. An indicator 13 for each individual channel 11a-11d is also shown on the display means 3, as is an indicator of each file 10 transmitted to a channel at a specific time. In the instance shown, the file indicators 12 are shown adjacent the channel indicators 13.

During the mixing cycle the indicators 12 for each file in a channel are displayed to users at a first resolution, and then on generation of the composition the indicators 12 for each file are displayed at a second resolution which differs from the first resolution. Generally, the first resolution is lower than the second resolution and users are able to set the first and/or second resolutions.

The user control means is operable to activate a selection of the individual channels 11a-11d to enable the files 10 in the selected channels to be combined in a mixing cycle to generate a multimedia composition having one or more of audio content and video content and still image content and text content. The multimedia composition is generated in real time. The control means also enables users to transmit a further file 10 to a channel 11 already having a file transmitted thereto and users can specify whether the further file is to replace the file presently in the channel or whether it is to be incorporated into the channel with the previously transmitted file.

The user control means is further operable to enable the user to set composition authoring parameters, indicated generally by the reference numeral 14, which are assigned to each channel 11a-11d. Such composition authoring parameters 14 may relate to volume settings for each channel 11a-11d or the application of various templates to the file content to, for example, modify the speed or tempo of an audio file, apply special effects to the file. It will therefore be understood that the composition authoring parameters will modify, refine, adjust, vary and/or change performance characteristics of the files 10 transmitted to the channels 11. The composition authoring parameters 14 once set are then applied to the files 10 in the channels 11a-11d by the authoring programs 2 in the mobile telephone 3 to generate the multimedia composition. The composition authoring parameters 14 are also settable and adjustable during combining of the channels to form the multimedia composition. In this way users may adjust previous settings for the composition authoring parameters 14 during the mixing cycle.

The control means is further operable to enable users or mobile phone operators to set upper threshold size limits for compositions and/or individual files in a composition. An alert is notified to a user via the mobile device when the upper threshold size limit is about to be reached or when it has been reached.

Also provided are indicators 15 for each settable composition authoring parameter 14. In the instance shown the indicators 15a-15d are shown adjacent to the channel indicators 11a-11d to which it is assigned. It is ascertainable from the indictors 15a-15d whether or not a composition authoring parameter 14 has been set by a user and/or and the specific files 10a-10d which have been transmitted a channel 11a-11d. For each composition generated a record of the composition authoring parameters 14 set is also stored for future access by users. Users may also specify the sequence of individual frames in a generated multimedia composition.

Each composition generated is able to be transmitted via a telecommunications network as a multimedia message or e-mail, posted to a web-site, saved as a ring-tone, video-tune, caller identification and/or wallpaper and is also able to be saved for transmission to a further device.

A composition may also be used to uniquely identify a telecommunications device which is calling the mobile telephone.

Referring now to FIG. 14, a specific embodiment of the present invention will be described. In this embodiment, users are able to view thumbnail images of all supported media files on the display and assign files to each of the six channels 40a-40f.

With reference to FIG. 14.1, shown are file thumbnail views by file type (audio, video, image and project). These icons or indicators may be selecting using drop-down menu 41 or deselected as required. The bottom of the screen provides indicators 42 for the selected filter types. The user can therefore filter the thumbnail views by location by selecting the 'filter by location' option in the drop down menu (not shown in this figure). Once the user enters the desired location the media browser will only display supported files stored in that location.

Referring FIG. 14.2, the user can preview an audio file by highlighting an audio file in the media browser and selecting the "preview" option on the soft key options. The preview playback options are: play, pause and stop. When the user selects to preview an audio file a "file explorer" style media pop-up player control will be displayed. No further activity on the application is possible during audio file preview play. The user can also create an 'audio note' file by selecting the microphone option on the Menu drop-down menu (not referenced in this figure). The user can also transmit a media file to a channel 40a-40f by either highlighting a file and then moving the cursor to the desired channel number then pressing the 'assign' icon, or alternatively by pressing the 'assign' option in the drop-down menu 43.

An audio, video still image and/or text file can be assigned to any channel in any combination.

The user can remove the file from a channel by pressing the 'clear' option in the drop-down menu 43. If more than one transmission is made to a channel the latest assignment will override the existing assignment with the exception that the user may add an image file to a channel where an image file is already assigned.

Referring now to FIG. 14.3, the status of each channel is shown by background and foreground colour coding—the channel will remain grey until a file is transmitted to a channel and when it is it will change to a highlighted colour. The current position in the list of available media files will be shown with background colour coding—the currently selected file will have a blue background.

The type of file assigned to a channel shall be shown with a pictogram button showing an icon of the file type (audio, video, image and text), which becomes highlighted and active once the file transmission is made.

The 'Progress to Mixer/Start Mix' option in the drop-down menu will remain disabled until the user transmits a file to a channel 40*a*-40*f*. The user can progress to the mixer screen by selecting the 'Start Mix' button 44 at the bottom right of the screen, which becomes active once any channel 40*a*-40*f* has received a file.

The user can also access further composition authoring parameters, including advanced editing features for each channel 40*a*-40*f* (dependant on file type) by selecting the 'Advanced' option in the drop-down menu once a file has been transmitted to a channel.

Figure 16:
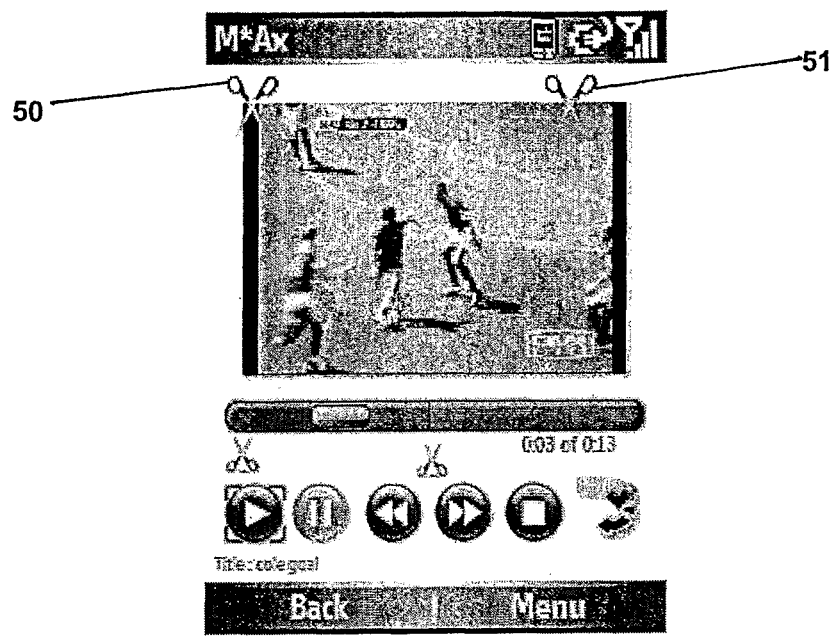
FIG. 16 shows an Advanced Video screen where the user can edit sections of the video.

FIGS. 15 and 16 show further composition authoring parameters available for use by users and include an option enabling users to define new start points and end points for files being mixed in each channel. The user can preview the file, apply start and end cut points and preview the resultant edited file. The user selects the new start and end points of the file by selecting the 'Start Cut' 50 or 'End Cut' 51 either during playback or when paused. The new start/end points will be shown on both the progress and preview screen at all times. The default playback value for video and image files in a mix is set to loop once, whilst the default audio files is loop continuously. These default values can be toggled by the user with the "loop" button 52. The application will highlight the selected start and end points of the file using colour effects and markers.

Figure 17:
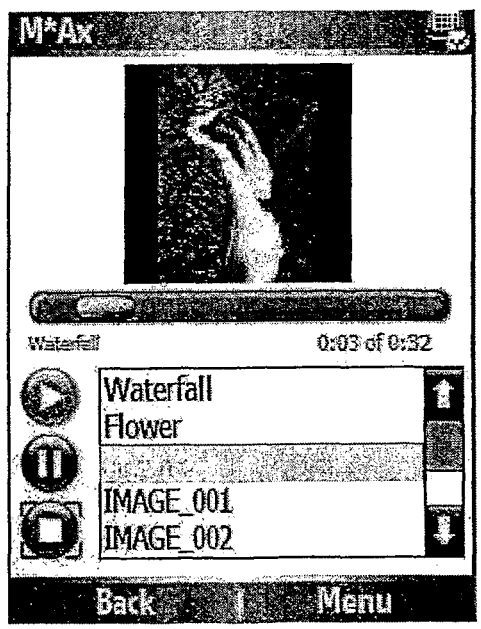
FIG. 17 shows an Advanced Image Screen where the user can create slideshows using multiple image files and assign transition and text effects.

FIG. 17 illustrates a tool enabling a user to create a slideshow from a selection of images previously selected when the files were transmitted to a channel. With reference to FIG. 17.1, the user can change the order in which the images will appear in the slideshow using the Playlist 'Move Up' button 53 and 'Move Down' button 54 on the drop down-menu list. A user can also remove an image from a play-list using the 'Remove' button 55 on the Menu drop-down menu list. The user can change a transition effect between the images in the slideshow using the Effect button 56 in the drop-down menu list. The user can thus select the transition effect direction in the slideshow and the time that each image is displayed in the slideshow by using the scroll list boxes and highlighting the desired direction (if applicable) and time. The user can also preview and control playback of the slideshow.

For applying text effects a pop-up window will be shown displaying a text entry dialogue box 57, font selection 59, font colour selection 58, where this effect is to be applied in a channel and a channel number selection tick box.

FIG. 18 shows the provision of utility enabling users to define text effects for start and end credits for all channels. The user selects to either add start or end titles by selecting one of the two text effect buttons. The user can define Start Credit text (which becomes enabled once the mix is started and will be displayed prior to any other channel), change the font, font size, font colour, transition effect, direction and enter the text from this screen. The playback of the Start Credit text effect will occur at the start of the mix The user can define End Credit text (which becomes enabled once the mix is stopped), change the font, font size, font colour, transition effect, direction and enter the text from this screen. The user can preview and control playback of the text effect by selecting the following buttons: Play/Pause.

It will be understood that compositions can contain any combination of audio, video, text or images and is not restricted or limited in the number of mixing channels that can be accommodated. Channels can be enabled/disabled without a mix running. The audio channels can be simultaneously mixed.

The user can navigate the channels using either the navigation pad or the corresponding key numbers on the keypad. Once in control of a channel, the volume of each channel can be independently controlled using the volume slider controls 60 which can be moved up and down using the navigation pad. The volume of each channel can be changed when the channel is enabled or disabled. The master volume for the mix can be changed using the master volume slider control 61. Once in control of the master volume channel, the volume can be brought up, down or muted using the navigation pad. The master volume can be adjusted whilst a mix is running. An effect can be applied to a channel when the channel is enabled or disabled. An effect is stopped being applied to a channel by selecting and activating the effect enable/disable button at any point during a live mix. When a channel with audio media is enabled it will start playback from the start of the file and loop continuously (default setting that can be changed in the Advanced Audio screen). When a channel with video media is enabled it will start playback from the point at which the file was last enabled and play once through only (default setting that can be changed in the Advanced Audio screen). A mix is finished when the 'Stop Record' button 62 is selected and activated (19.2 (A)).

The save screen is accessible once a composition is created. Changing the media selection erases any current mix.

From selection list 63 as users may wish to send their mix as a MMS (Multimedia Messaging Service) or email from their mobile telephone, or post the composition to a web-site, save it as a ring-tone, video-tune, caller identification and/or wallpaper or save it for transmission to a further device they may want to set the complete file size of the mix to, for example, the optimum settings for MMS and email formats. With reference to FIG. 19.3, the size of the mix can be predetermined by a Wizard function; once that size has been reached, the application will automatically stop the current mix at that point.

Figure 20:
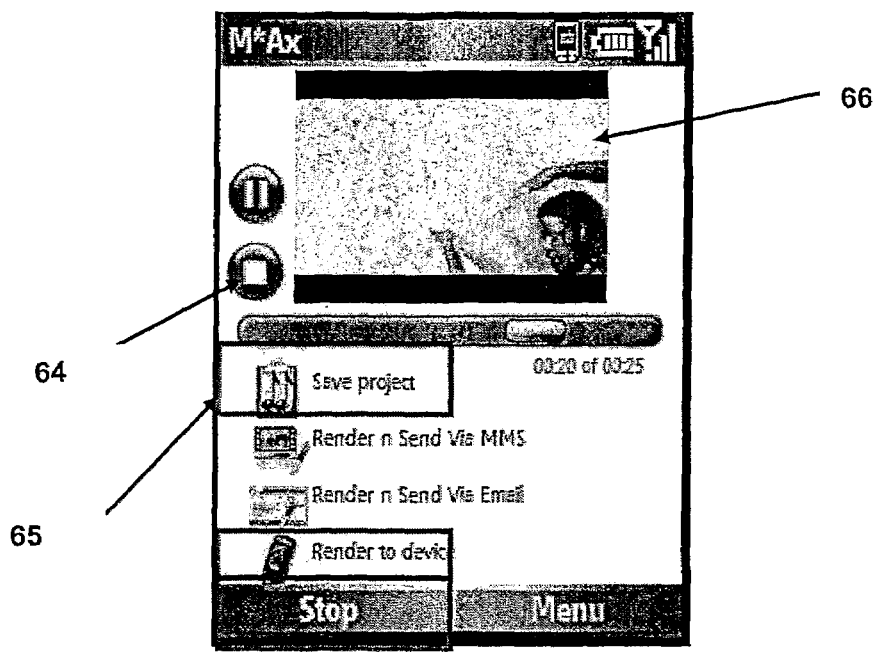
FIG. 20 shows an 'Save' screen where the user can save their mix to the format and location of their choice.

FIG. 20 shows the 'Save' screen and with this screen the user send their mix as a MMS (Multimedia Messaging Service) or email from their mobile telephone, or post the composition to a web-site, save it as a ring-tone, video-tune, caller identification and/or wallpaper or save it for transmission to a further device. The user can control playback of the last saved mix file by selecting and activating the buttons: Play/Pause/Stop button 64. The user can save a composition by selecting and activating the "save mix as" button 67. The user can then enter the desired filename, location and file type. The user can also save their mix as a project by selecting and activating the "save project" button 65, which saves the time-stamped file of the mix and the media clips used to a default location.

The user can also 'Render the Mix to the Device' and decide on the type of file they wish to create, i.e. unlimited mix, ring-tone, video-tune, wallpaper or caller ID.

A further embodiment of the present invention shall now be described, again with reference to FIGS. 1 to 13, in which the present invention has been deployed on a mobile telephone or other mobile communications device. In this embodiment reference will be made to the use of audio files having the .WAV file format, however it is to be understood that present invention can be implemented for use with a wide variety of file types, including audio files, video files, still image files and a text files and is this suitable for use with formats including JPEG, TIFF, MPEG, AVI and so forth.

Figure 1:
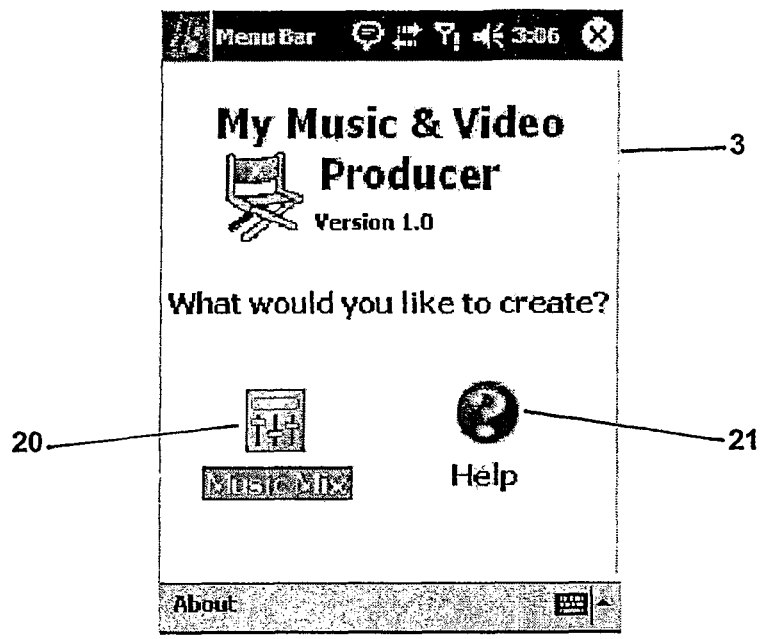
FIG. 1 shows the main menu screen with Music Mix icon selected.

FIG. 1 shows the execution of the present invention on the display means of the mobile telephone, and in particular shows the what is displayed when the interactive multimedia apparatus is first started. The display means 3 shows two selectable indicators or icons, namely a 'Music Mix' icon 20, which if selected brings the user to a file explorer and assignment screen, and a 'Help' icon 21 which can be selected to start up a 'Windows Mobile Help' application (see also FIG. 10). It is possible to include further icons to enable users to select, for example, an image and video mix if so desired. The icons are selectable by for example, double tapping the icon using a touch screen, using the front panel keys on the mobile telephone (left, right, up and down which may correspond to numerical keys 4, 6, 2 and 8 respectively) to select the icon and pressing the enter key (also on the front panel) or a single tap on the icon followed by pressing the front panel enter button.

On starting the application by selecting the 'Music Mix' icon, audio file scanning of all files accessible by the mobile telephone commences. Thus if a hard disc or memory card, such as, for example an SD memory card, has been inserted into mobile telephone it to is also scanned.

Figure 2:
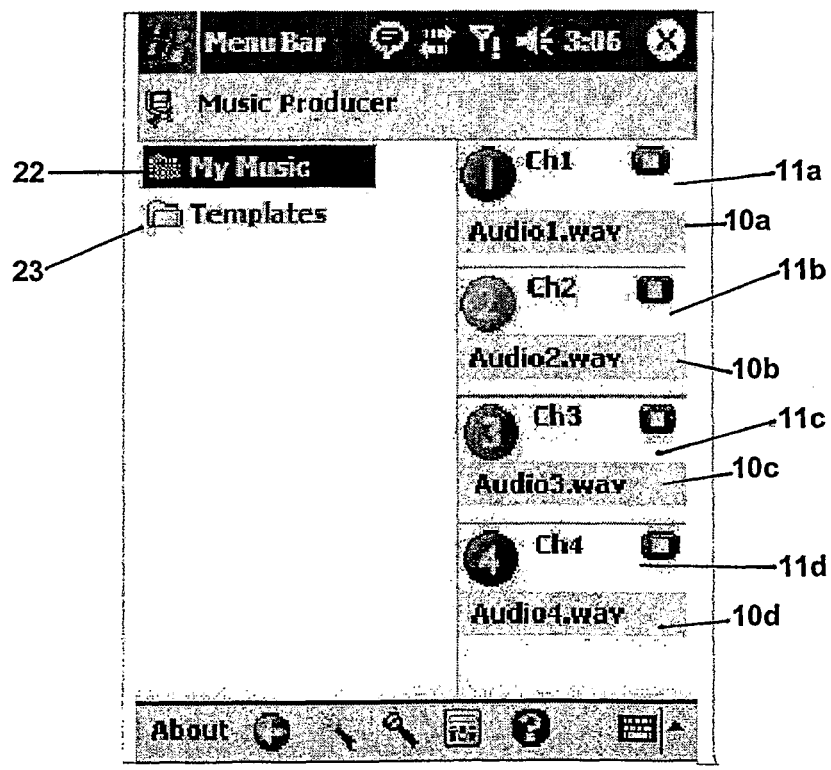
FIG. 2 shows the file explorer and channel assignment screen indicating sample directories and with 'my music' directory selected.
Figure 3:
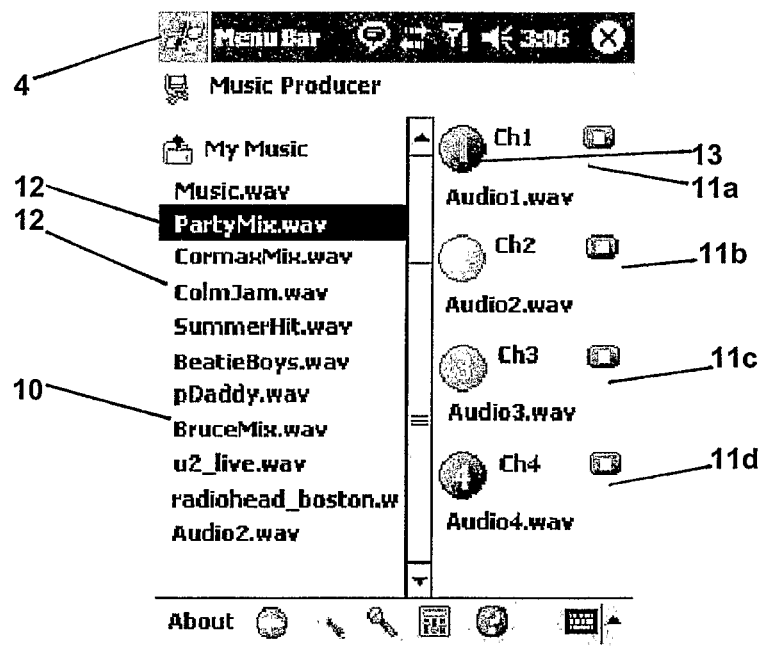
FIG. 3 shows the file explorer and channel assignment screen with the 'My Music' directory opened and sample files contained therein.

As shown in FIGS. 2 and 3, a list of all waveform audio files (*.WAV) located during the search is generated and presented to users in a folder entitled 'My Music'. A template folder within the operating system of the mobile telephone is also scanned for template files. Each template consists of four .WAV channels beat-matched ready for mixing. During the scanning period the message 'Scanning, please wait' is displayed on the display means and whilst this message is being displayed the music mix icon is disabled and may be 'greyed' out so as to indicate to users that it is presently unavailable for selection.

It will be appreciated that the present invention provides a 'Windows Explorer' like interface and shows a list of folders indicating the location of the files found during file scanning. This includes the 'My Music' folder icon 22 and the 'templates' folder icon 23. The right side of the screen shows the four beat-matched .WAV channels 11a-11d and the currently assigned files 10a-10d for each of the beat-matched .WAV channel.

Navigation between the display icons is controlled using the left and right arrow keys of the alphanumeric keypad of the mobile telephone. Each feature on the display is highlighted in turn by manipulation of the left and right arrow keys. If an icon is highlighted and the enter key is then selected pressed then the icon is selected.

The icons on the left hand side of the display may be navigated and selected by, for example, double tapping on a folder to change the explorer view to list the files or directories in the current folder, and to list the files name and extension, as well as by using the up and down arrow keys to move between icons and then selecting or pressing the enter key to expand or collapse a drop down directory.

Figure 4:
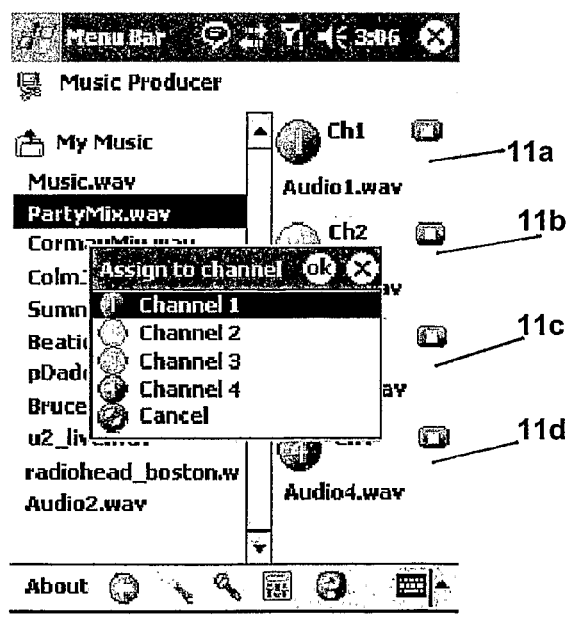
FIG. 4 shows the file explorer and channel assignment screen with the 'Assign to Channel' menu opened.

With reference now to FIG. 4, the transmission of a file to a channel is shown and involves either dragging and then dropping a selected file onto a channel icon or selecting a desired file by reference to a file indicator and then using up/down arrow keys and then pressing enter to display the channels, in this case four channels, to which the files may be transmitted. The user selects the desired channel or alternatively can cancel the operation.

When a file is transmitted to a channel it starts playing automatically. Stop icons or buttons are displayed next to each channel to allow the user to stop a channel at any time. If a second or subsequent channel is played while a first channel is actually playing then the first channel is automatically stopped prior to the second or subsequent channel being played.

Figure 5:
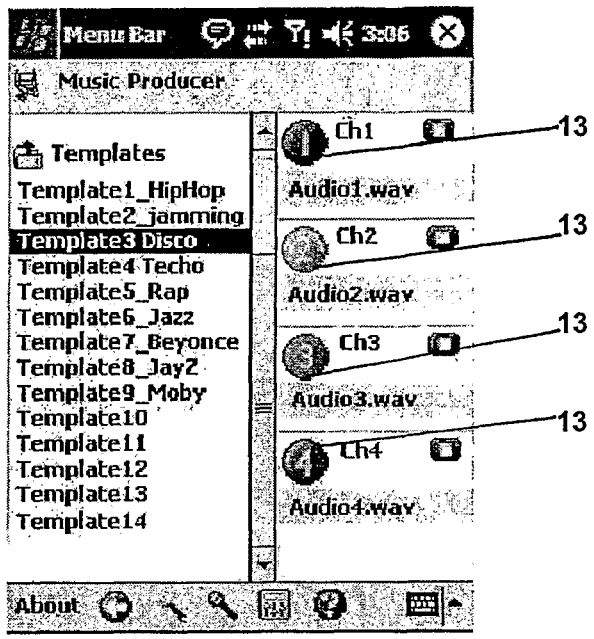
FIG. 5 shows the template view screen with a sample template file selected.

With reference to FIG. 5, template selection is achieved using either dragging and dropping of one or more template, wherein dropping a template onto any channel loads the selected template thereby assigning the component files to the channels one to four automatically. Alternatively, the arrow keys on alphanumeric keypad of the mobile telephone may be used to select one or more desired templates and subsequently pressing the enter key to load the selected template(s) to the required channels.

A play button is additionally displayed for each channel to allow playing of each template channel component.

Figure 6:
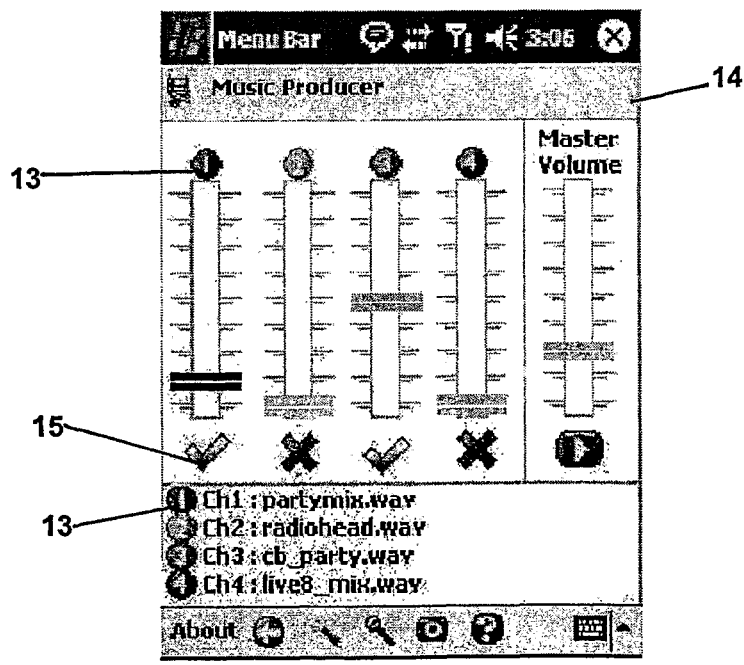
FIG. 6 shows the Music Mix screen with channel 1 selected.

FIG. 6 shows a volume control for each channel, a master volume control and five icons comprising a stop button which stops the mix session, a save button which moves the user to the save and send screen, a back button which moves to the channel assignment screen, a help button which launches the mobile help application (see FIG. 10) and a record button which starts the recording session.

A preview play icon is provided which if selected plays the file in each channel continuously in a loop until the user clicks the stop icon.

Also shown are volume levels icons, support for playback of four channels in real time as opposed to static intervention after the composition has been generated. The user is also able to hear the resulting mix of the four channels in real time. Furthermore the user can toggle between each channel during a mixing session and use the volume slider on each channel during a mix, as well as setting various composition authoring parameters.

Figure 7:
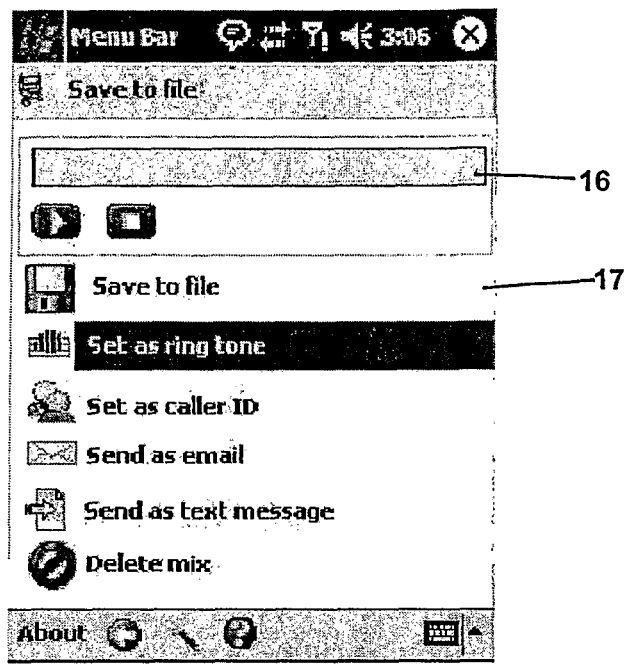
FIG. 7 shows the Preview Mix & Save and Send screen with 'Set as ring tone' selected.

With reference to FIG. 7, the display shown indicates various options available to user with regard to the multimedia composition. For example, users may wish to listen to the mix and then use the resultant composition, which it will be appreciated is also stored as a file. A preview control panel is provided which allows the user to preview a composition prior to saving, or indeed assigning as a file for a new composition. The preview control panel includes a play button to start playing the mix and a stop button to stop playing the mix. The preview control panel also has a slider bar 16 to indicate the position of the track in time during play of the mix. This indicator in the slider bar moves along while the mix is playing to indicate the current position in the mix track.

Located directly below the preview control panel is a menu 17 providing various user options including saving the composition to a file. This option, if selected, will bring the user to the Windows Mobile standard 'save file as' screen (see FIG. 8). Also included are options to set the composition as a ring tone, set composition as a caller ID, send the composition as an email, send the composition as a text message (MMS), and delete the composition.

Figure 10:
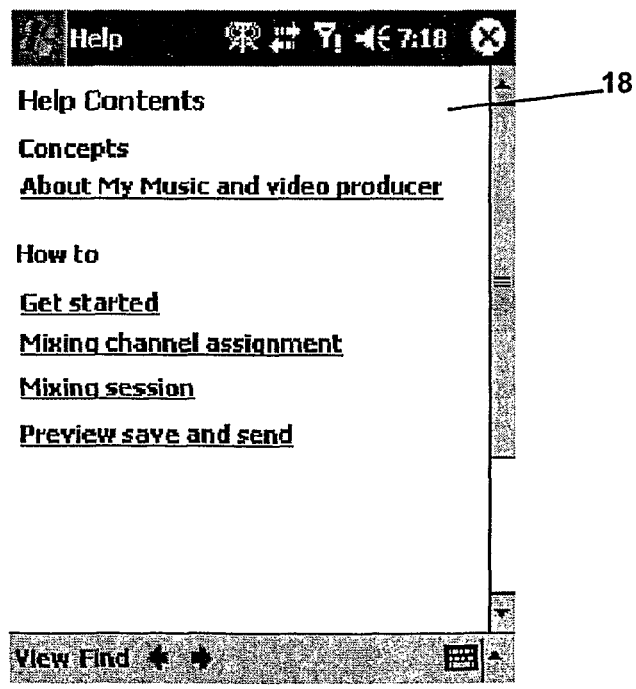
FIG. 10 shows the Help screen.

Located at the bottom of the screen are back button which provides a cancel option an Options button and a help button which launches the Windows 'TM Mobile' help application loaded with html for this application (see FIG. 10).

Figure 8:
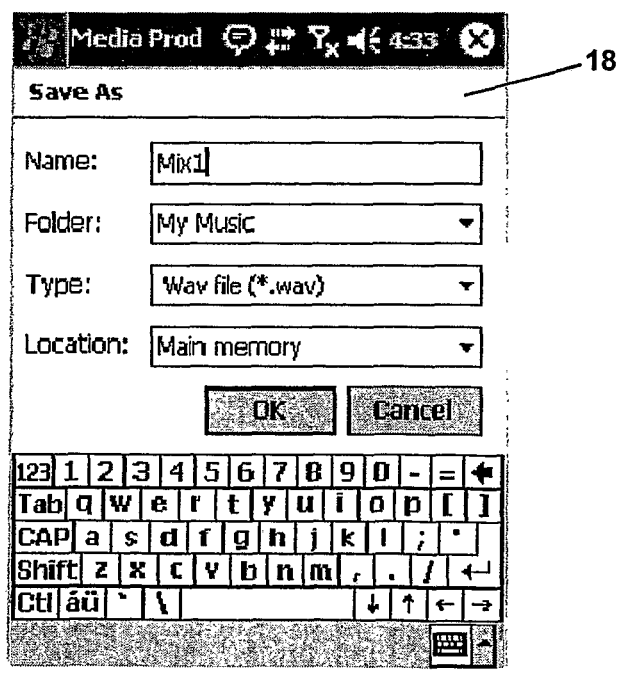
FIG. 8 shows the Windows Mobile Save As screen with sample information indicated.
Figure 9:
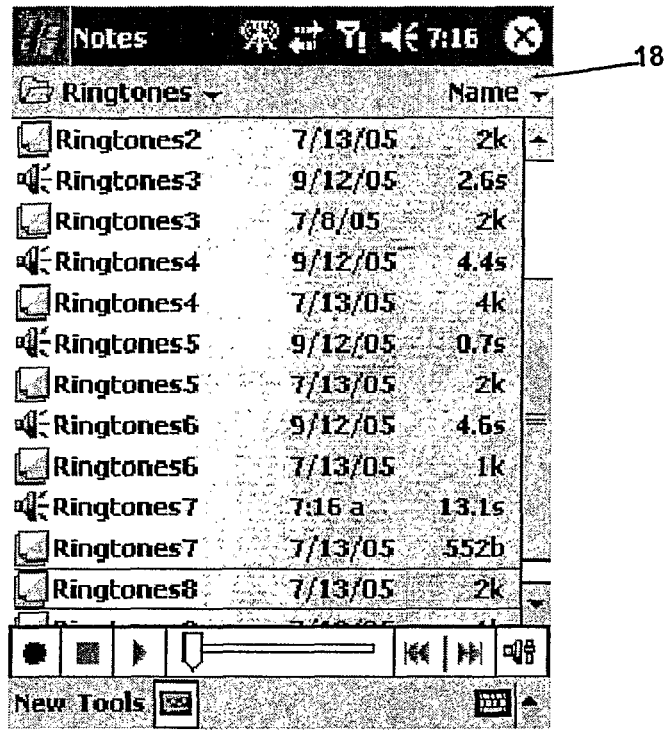
FIG. 9 shows the Voice Record screen with sample files indicated.

Referring now to FIGS. 8, 9, and 10, the format of the standard Windows TM Mobile 'Save As' screen 18, standard Windows 'TM mobile' voice recorder application and standard Windows 'Mobile help' application loaded with html help pages for this application are shown therein. The display of these elements can be supported in landscape or portrait mode.

In this present instance, the composition created from the four channels is saved in .WAV format. The file size is limited to 95% of the available space left in the mobile teleohones accessible data store. The mix recording session is stopped if the file gets too large and the user is notified by an alert in a 'pop-up' screen. Furthermore the user is notified if a record session is started and there is not enough space left to continue.

Figure 11:
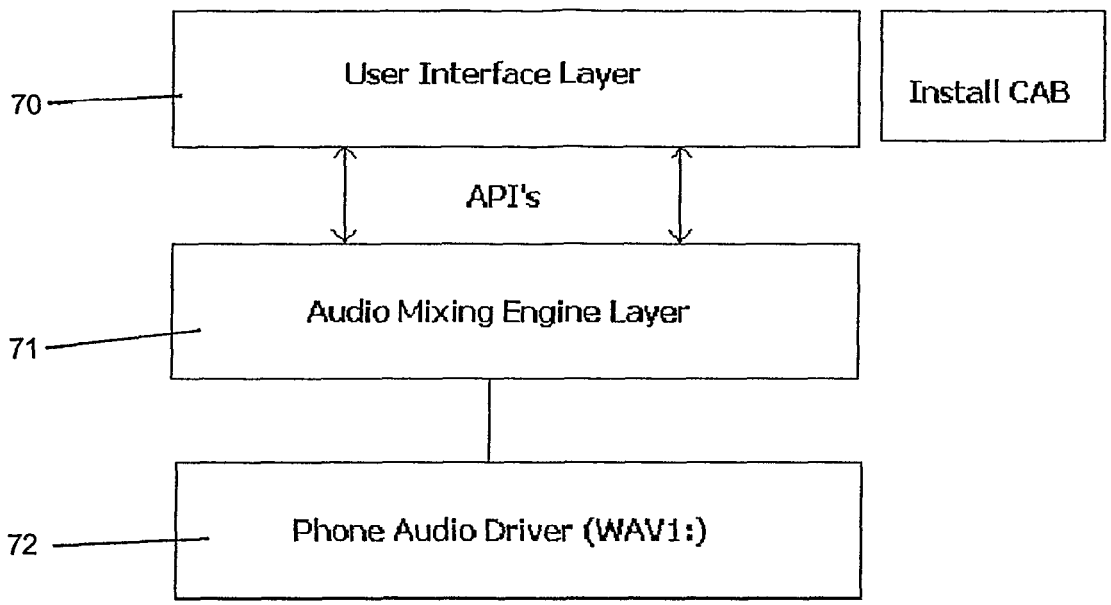
FIG. 11 is schematic illustration of the components of the StikAx TM Mobile Application software.

Referring now specifically to FIG. 11, the present invention has a system structure comprising a user interface layer 70, an audio mixing engine layer 71 and a phone audio driver layer 72 (entitled 'WAV1'). The audio mixing engine layer is implemented as a flat dynamic link library (DLL) and comprising a number of application programming interfaces (APIs) which are able to be deployed to the mobile telephone. There shall also be a library file for the user interface executables to link to and a header file for function prototypes.

Figure 12:
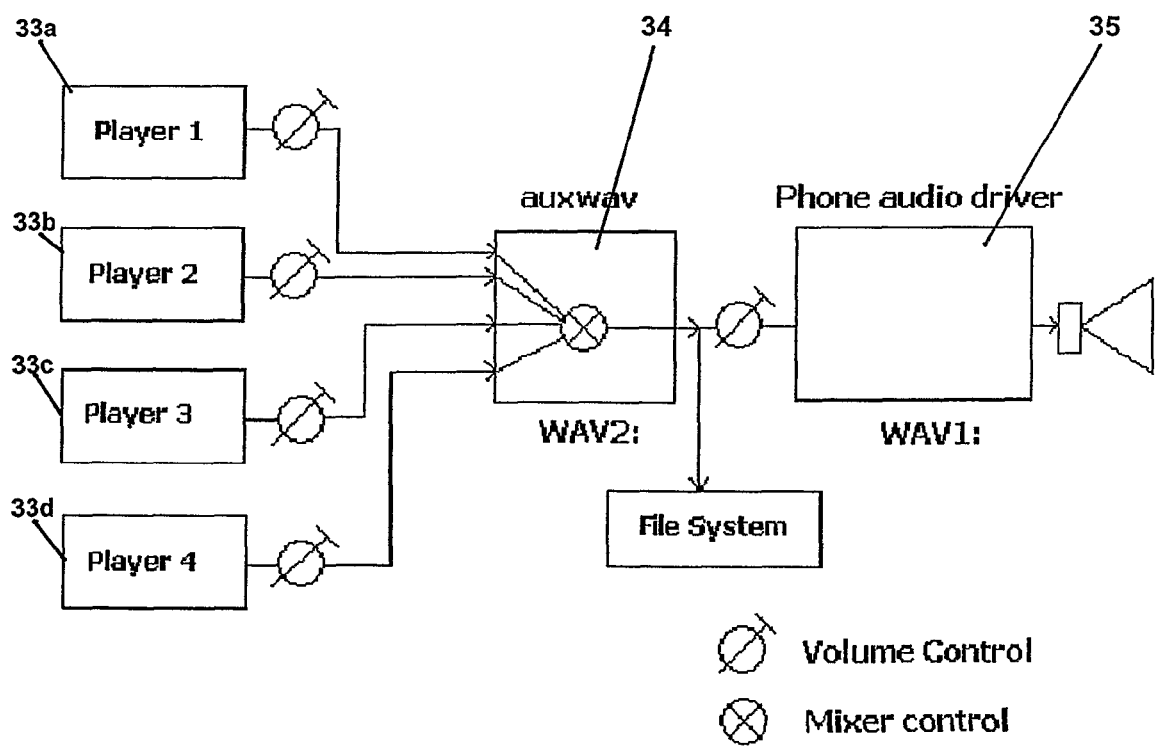
FIG. 12 is a block diagram illustrating the audio mixing engine.

Referring now to FIG. 12, the engine supports four players 33a-33d in which one player is assigned to each channel. This allows the control means of the present invention to play each file selected for a specified channel. The actual combining or mixing of the four channels is performed using the auxiliary audio driver 34. The output from this driver is relayed to the phone audio driver 35 to play the composition in real time. The output from the auxiliary driver 34 also writes the mixed samples to a temporary file located in the data store accessible by the mobile telephone.

It is preferable for there to be sufficient CPU resources to render and play the composition in real time. In the event that there is insufficient CPU resources a two stage process implemented. The phone audio driver 35 is used to play and mix the file content in real time and to log the mixing volume changes, as well as channel toggles then renders the mix to a file as a separate stage using the auxiliary audio driver 34. Each player 33a-33d is capable of playing the content of a specified file. There is an API to assign a file to one of the four channels. Each player then has an API to start a channel playing and to stop it for the purpose of previewing a selected file. Each player shall use the waveform audio API set to write audio samples to the phone audio driver 35 when playing a single channel and the auxiliary audio driver 34 when in mixing mode. There are also APIs to start and stop the mixing process.

The auxiliary audio driver 34 is responsible for performing the audio mixing. It will be appreciated that in the event that different file types, such as video, image and/or text are being mixed then these components may be adjusted as required to take account of the different file types. The auxiliary audio driver 34 is based on a Unified Audio Model (UAM) driver that has support for multiple streams and built in mixing. The output from the players 33a-33d is input to this auxiliary audio driver 34. The resultant mixed stream is available for live play by transmitting it to the phone audio driver 35 using the waveform audio API set and is available for writing to a temporary file to store the mix as a file. Ideally the mixed stream is 44.1 kHz audio. The driver is called auxwav.dll and is loaded when the mixer application is run for the first time using the "RegisterDevice" API.

The following is an example of the registry keys which are required for the drivers:
    [HKEY_LOCAL_MACHINE\\Drivers\\Drivers\\Custom\\auxwav
    "Prefix"="WAV"
    "Dll"="auxwav.dll"

These keys are written by the installation program. A reboot is required after installation.

The data store accessible to the mobile telephone also uses a file system which is responsible for saving the raw samples output from the auxiliary wave driver 34. This may be a temporary file and would optimally be located in "\My Music\tempmix.WAV" and is a stereo 16 bit, sampling frequency 44.1 kHz. All APIs return a HRESULT. S_OK output for success and E_INVALIDARG for illegal input parameters.

Some of the APIs available to the User Interface Layer are listed below;
    (1) Init
    HRESULT Init( )
This API performs initialisation for the control means and must It needs to be called each time the multimedia application is launched.
    (2) Channel Player Controls APIs
        (a) SelectWavFile
        HRESULT SelectWavFile(BYTE byChannel, LPCTSTR pzFilename)
This API assigns a wav audio file to a channel.
Inputs:
byChannel, Channel 1 to 4
pzFilename, full path to specified audio file.
        (b) Play
        HRESULT Play(BYTE byChannel)
Start playing the specified channel. If another channel is playing then it shall be stopped.
        (c) Stop
        HRESULT Stop(BYTE byChannel)
Stop playing the specified channel.
    (3) Mixing APIs
        (a) StartMix
        HRESULT StartMix( )
This starts the mixing session. All four channels are played live at the same time. The mixed file is recorded to the temporary file "\My Music\tempmix.WAV". If there is not enough space to continue then ERROR_DISK_FULL is returned. If space runs out during a mix session a windows message is broadcast as described later.
        (b) StopMix
        HRESULT StopMix( )
This stops the mixing session. The audio play back is stopped. The temporary mix file is closed.
        (c) SetMixVolume
        HRESULT SetMixVolume(BYTE byChannel, BYTE byVolume)
This sets the volume on the mixer screen.
Inputs:
byChannel, the channel to change the volume (1-4).
To change the master volume, specify the channel as 0.
byVolume, the volume level to set (0-100).
This allows the user interface to obtain the current volume settings.
        (d) GetMixVolume
        HRESULT GetMixVolume(BYTE byChannel, BYTE *pbyVolume)
Inputs:
byChannel, Channel 1-4 or 0 for master volume
Outputs:
pbyVolume, the returned volume level (0-100)
        (e) PlayMix
        HRESULT PlayMix( )
Plays the mix as stored in the temporary mix file.

(f) StopPlayingMix
HRESULT StopPlayingMix( )
This stops the mix playing.
Returns the current play position as expressed as a value 0 to 100.
  (g) GetMixPlayPosition
  HRESULT GetMixPlayPosition(WORD *pwPosition)
  (h) GetVersions
  The following API is used to retrieve the versions of the auxwav driver dll and the StikAx_Mixer dll.
    HRESULT GetVersions(STIKAXDLL_VERSION* pVersion)
    Where
    STIKAXDLL_VERSION is defined as a structure
      Int iAuxwavMajor;
      Int iAuxwavMinor;
      Int iStikAxMajor;
      Int iStikAxMinor;
  When there is insufficient memory space left on the filing system during saving of a mixed file a message stating DISK FULL is displayed.

The CAB file referred to above in respect of FIG. 11 is produced to install the software on the phone using, for example, ActiveSync. This CAB file shall perform tasks including copying the executables and dynamic link libraries to the device, installing program icon in program menu, making the necessary registry changes, registering aux wav driver and/or re-starting the device.

The Registry

The user interface layer shown in FIG. 11 uses registry entries to store information. These entries can be found under HKEY_LOCAL_MACHINE\Software\Intrinsyc in the device registry, and are described in the table shown in FIG. 13.

Template files contain track file names and directory information. This information is stored in the following format Directory,filename.
  For example:
  \My Documents\My Music\, Test4.WAV;
  \My Documents\My Music\, Test1.WAV;
  \My Documents\My Music\, Test2.WAV; or
  \My Documents\My Music\, Test3.WAV.

Each audio mixing engine API is called using the following methods.
  (a) Init
  Calls the Init( ) API method. Initialises the mixing engine;
  (b) SendWavFileToEng
  Calls the SelectWavFile(byChannel, pzFilename) method;
  (c) PlayChannel
  Call the API method Play(byChannel);
  (d) StopChannel
  Calls the API method Stop(byChannel);
  (e) StartAudioMix
  Calls the API method StartMix( );
  (f) Stop AudioMix
  Calls the API method StopMix( );
  (g) SetAudioMixVolume
  Calls the API methos SetMixVolume(byChannel, byVolume);
  (h) GetAudioMixVolume
  Calls the API mmethod GetMixVolume(byChannel, byVolume);
  (i) PlayAudioMix
  Calls the API method PlayMix( );
  (j) StopPlayingAudioMix
  Calls the API method StopPlayingmix( );
  (k) DeleteAudioMix
  Calls the API method DeleteMix( ); and
  (l) GetAudioPlayMixPosition
  Calls the API method GetMixPlayPosition(*pwPosition).

The method arguments byChannel, byVolume, pzFilename and pwPosition are declared as BYTE, BYTE, LPCTSTR and WORD* respectively.

It will of course be understood that the invention is not limited to the specific details described herein, which are given by way of example only, and that various modifications and alterations are possible within the scope of the invention.

The invention claimed is:

1. An interactive multimedia apparatus usable in combination with a software suite of authoring programs installed in a computing means of a mobile data processing apparatus having a display means and one or more input means the interactive multimedia apparatus comprising:
  user control means operable to allow a user to transmit one or more of an audio file and a video file and a still image file and a text file, including a combination thereof, to respective channels of a plurality of channels on the mobile data processing apparatus, and then to activate a selection of the respective channels to enable a plurality of files in the selection of channels to be combined in a mixing cycle to generate a multimedia composition having one or more of audio content and video content and still image content and text content, the user control means being further operable to enable the user to set composition authoring parameters assigned to a selected channel, whereby when the composition authoring parameters assigned to the selected channel are adjusted by the user, authoring programs are operable to apply the parameters to modify, refine, adjust, vary and/or change performance characteristics of one or more files in the selected channel to generate the multimedia composition during the mixing cycle; and
  means enabling the composition authoring parameters to be settable and adjustable by the user in real time during continuous playing of the plurality of files in the selection of channels combined in the mixing cycle, while simultaneously rendering the combined selection of channels to an output file.

2. An interactive multimedia apparatus as claimed in claim 1, further comprising means for presenting an indicator of each file which is suitable for use in a composition is presented for selection to the user on the display means of the mobile data processing apparatus.

3. An interactive multimedia apparatus as claimed in claim 2, further comprising means for displaying the indicators for each file in a channel to users at a first resolution during the mixing cycle, and then on generation of the composition displaying the indicators for each file at a second resolution which differs from the first resolution.

4. An interactive multimedia apparatus as claimed in claim 3, wherein the first resolution is lower or higher than the second resolution.

5. An interactive multimedia apparatus as claimed in claim 3, further comprising means for enabling users to set the first and/or second resolutions.

6. An interactive multimedia apparatus as claimed in claim 2, in which the file indicators are shown adjacent to the channel indicators on the display means of the mobile data processing apparatus.

7. An interactive multimedia apparatus as claimed in claim 2, wherein it is ascertainable from the indicators whether or not a composition authoring parameter has been set by a user and/or a file has been transmitted to a channel.

8. An interactive multimedia apparatus as claim in claim 1, further comprising means for presenting an indicator of each channel on the display means of the mobile data processing apparatus.

9. An interactive multimedia apparatus as claimed in claim 8, wherein an indicator of each composition authoring parameter is shown adjacent to the indicator of the channel to which it is assigned for at least two files of the same media type displayed at the same time by the display means.

10. An interactive multimedia apparatus as claimed in claim 1, further comprising means for presenting an indicator of a file transmitted to a channel at a specific time is shown on the display means of the mobile data processing apparatus.

11. An interactive multimedia apparatus as claimed in claim 1, further comprising means for presenting an indicator of the file format of a file transmitted to a channel at a specific time is shown on the display means of the mobile data processing apparatus.

12. An interactive multimedia apparatus as claimed in claim 1, further comprising means for ensuring the use of which does not interfere with the normal operation of the mobile data processing apparatus or prevent the execution of other applications on the mobile data processing apparatus.

13. An interactive multimedia apparatus as claimed in claim 1, wherein each file has a file extension which comprises tempo and beat map information for the file.

14. An interactive multimedia apparatus as claimed in claim 1, wherein the mobile data processing apparatus further comprises an accessible data store having one or more audio files, video files, still image files and/or text files stored thereon.

15. An interactive multimedia apparatus as claimed in claim 14, further comprising scanning means for searching the data store, and files stored on the mobile data processing apparatus, for all files having predefined file formats.

16. An interactive multimedia apparatus as claimed in claim 1, wherein the user control means is further operable to enable users to specify the sequence of individual frames in a multimedia composition having video content.

17. An interactive multimedia apparatus as claimed in claim 1, wherein files having different file formats are able to be combined into a single or multiple multimedia compositions.

18. An interactive multimedia apparatus as claimed in claim 1, further comprising means for storing a record of the composition authoring parameters set for each composition.

19. An interactive multimedia apparatus as claimed in claim 1, wherein when a further file is transmitted to a channel already having a file transmitted thereto the further file replaces the file presently in the channel.

20. An interactive multimedia apparatus as claimed in claim 1, wherein when a further file is transmitted to a channel already having a file transmitted thereto the further file is incorporated into the channel with the previously transmitted file.

21. An interactive multimedia apparatus as claimed in claim 1, further comprising means for enabling each composition generated to be transmitted as a multimedia message or e-mail, posted to a web-site, saved as a ring-tone, video-tune, caller identification and/or wallpaper and is also able to be saved for transmission to a further device.

22. An interactive multimedia apparatus as claimed in claim 1, wherein the mobile data processing apparatus is a mobile telephone.

23. An interactive multimedia apparatus as claimed in claim 1, further comprising means for enabling a multimedia composition generated to uniquely identify a telecommunications device which is calling the mobile data processing apparatus.

24. An interactive multimedia apparatus as claimed in claim 1, wherein the input means comprises one or more of a video camera and a video recorder and an audio microphone and a keyboard and a mouse and a touch screen and a 3D input device and a tactile sensor and a voice recognition device and digitising hardware.

25. An interactive multimedia apparatus as claimed in claim 1, further comprising means for a user to record their own voice and/or other sounds originating outside the mobile data processing device and use those recordings to form part of a composition by transmitting to a channel.

26. An interactive multimedia apparatus as claimed in claim 1, wherein each composition has a start and a finish point which are shown on the display as spaced apart indicators, and means are provided for a user to edit sections of the composition with reference to the start and finish indicators.

27. An interactive multimedia apparatus as claimed in claim 1, further comprising means for users to create slide-shows using multiple compositions and are able to assign text to be displayed on the display means to each slide in the slide show.

28. An interactive multimedia apparatus as claimed in claim 27, wherein the user control means is further operable to enable users to specify the sequence of slides in a slide show.

29. An interactive multimedia apparatus as claimed in claim 1, further comprising means for users to assign specific text and text effects to each channel for application to a composition.

30. An interactive multimedia apparatus as claimed in claim 1, further comprising means for a user to access further composition authoring parameters-, including advanced editing features, for each channel once a file has been transmitted to a channel.

31. An interactive multimedia apparatus as claimed in claim 1, wherein the control means is further operable to enable users or mobile phone operators to set upper threshold size limits for compositions and/or individual files used in a composition.

32. An interactive multimedia apparatus as claimed in claim 31, further comprising means for transmitting an alert to a user via the mobile data processing device when the upper threshold size limit is about to be reached or when it has been reached.

33. An interactive multimedia apparatus as claimed in claim 1, further comprising means for displaying a channel indicator for each individual channel of the plurality of channels on the display means, and a file indicator for each file transmitted to one of the channels displayed adjacent to the associated channel indicator.

34. An interactive multimedia apparatus as claimed in claim 1, further comprising means for displaying at the same time an authoring parameter icon associated with each individual channel of the plurality of channels having files of the same media type on the display means, and means for the user to toggle between each channel to select a channel and use the associated authoring parameter icon to adjust the authoring parameter associated with the selected channel during the mixing cycle while the multimedia composition is played in real time.

35. A graphical user interface on a mobile telephone having stored thereon a software suite of authoring programs which when executed displays on display means of the mobile telephone the graphical user interface as a plurality of interactive channels and an interactive user control means, whereby the user control means is operable via the graphical user interface to allow a user to transmit one or more of an audio file and a video file and a still image file and a text file, including a combination thereof, to respective channels of a plurality of channels, and then to activate a selection of the respective channels to enable a plurality of files in the selection of channels to be combined in a mixing cycle to generate a multimedia composition having one or more of audio content and video content and still image content and text content, the user control means being further operable via the graphical user interface to enable the user to set composition authoring parameters assigned to a selected channel, whereby when the composition authoring parameters assigned to the selected channel are adjusted by the user, authoring programs are operable to apply the parameters to modify, refine, adjust, vary and/or change performance characteristics of the one or more files in the selected channel to generate the multimedia composition during the mixing cycle; and the composition authoring parameters being operable via the graphical user interface to be set and adjusted by the user in real time during continuous playing of the plurality of files in the selection of channels combined in the mixing cycle while simultaneously rendering the combined selection of channels to an output file.

36. A graphical user interface as claimed in claim 35, wherein the graphical user interface displays an indicator of each file which is suitable for use in a composition for selection by the user on the display means.

37. A graphical user interface as claimed in claim 35, wherein the graphical user interface displays an indicator of each channel on the display means.

38. A graphical user interface as claimed in claim 37, wherein the graphical user interface displays on the display means an indicator of a composition authoring parameter adjacent to the indicator of the channel to which it is assigned for at least two files of the same media type displayed at the same time.

39. A graphical user interface as claimed in claim 35, wherein the graphical user interface displays indicators for each file in a channel to users at a first resolution during the mixing cycle, and then on generation of the composition displays the indicators for each file at a second resolution which differs from the first resolution.

40. A graphical user interface as claimed in claim 39, wherein the first resolution is lower or higher than the second resolution.

41. A graphical user interface as claimed in claim 39, wherein the graphical user interface displays the file indicators as icons adjacent to the channel indicators on the display means.

42. A graphical user interface as claimed in claim 35, wherein the graphical user interface displays means for enabling users to set the first and/or second resolutions.

43. A graphical user interface as claimed in claim 35, wherein the graphical user interface displays an indicator of a file format of a file transmitted to a channel at a specific time.

44. A graphical user interface as claimed in claim 35, wherein the graphical user interface displays means for accessing a data store having one or more audio files, video files, still image files and/or text files stored thereon.

45. A graphical user interface as claimed in claim 35, wherein the graphical user interface displays means for transmitting the composition as a multimedia message or e-mail, for posting the composition to a web-site, for saving the composition as a ring-tone, video-tune, caller identification and/or wallpaper and for transmission to a further device.

46. A graphical user interface as claimed in claim 35, wherein the graphical user interface displays means to set a start and a finish point for a composition as spaced apart indicators on the display means.

47. A graphical user interface as claimed in claim 35, wherein the graphical user interface displays means for a user to assign specific text and text effects to each channel for application to a composition.

48. A graphical user interface as claimed in claim 35, wherein the graphical user interface displays means for a user to access further composition authoring parameters, including advanced editing features, for each channel once a file has been transmitted to a channel.

49. A graphical user interface as claimed in claim 35, wherein the graphical user interface displays means to set upper threshold size limits for compositions and/or individual files used in a composition.

50. A graphical user interface as claimed in claim 49, wherein the graphical user interface displays an alert to a user on the mobile telephone when the upper threshold size limit is about to be reached or when it has been reached.

51. A graphical user interface as claimed in claim 35, wherein the graphical user interface is displayed in a single window on the display means of the mobile telephone.

\* \* \* \* \*